(12) United States Patent
Heikkinen et al.

(10) Patent No.: US 11,910,032 B1
(45) Date of Patent: Feb. 20, 2024

(54) SYSTEMS AND METHODS FOR DISTRIBUTED MEDIA STREAMING

(71) Applicant: Rovi Guides, Inc., San Jose, CA (US)

(72) Inventors: Antti Heikkinen, Oulu (FI); Mikko Uitto, Oulu (FI)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/879,211

(22) Filed: Aug. 2, 2022

(51) Int. Cl.
*H04N 21/231* (2011.01)
*H04N 21/2187* (2011.01)
*H04N 21/2343* (2011.01)

(52) U.S. Cl.
CPC ... *H04N 21/23106* (2013.01); *H04N 21/2187* (2013.01); *H04N 21/23439* (2013.01)

(58) Field of Classification Search
CPC ......... H04N 21/23106; H04N 21/2187; H04N 21/23439
USPC ......................................................... 709/231
See application file for complete search history.

(56) References Cited

U.S. PATENT DOCUMENTS

| | | | |
|---|---|---|---|
| 9,398,498 B2 * | 7/2016 | Ozgur | H04W 52/0258 |
| 10,743,042 B2 * | 8/2020 | Ramadorai | H04N 21/25825 |
| 10,924,825 B2 * | 2/2021 | Das | H04W 36/08 |
| 10,986,387 B1 * | 4/2021 | Parulkar | H04N 21/23439 |
| 11,089,346 B2 * | 8/2021 | Mahvash | H04L 65/612 |
| 11,223,863 B2 * | 1/2022 | Asarikuniyil | H04N 21/23106 |
| 11,240,339 B2 * | 2/2022 | Chauhan | H04L 47/83 |
| 11,290,755 B2 * | 3/2022 | Wang | H04N 21/85406 |
| 11,356,516 B1 * | 6/2022 | Wu | H04L 67/02 |
| 11,356,909 B1 * | 6/2022 | Lloyd | H04W 36/0083 |
| 11,412,033 B2 * | 8/2022 | Ganguli | H04L 67/12 |
| 11,432,018 B2 * | 8/2022 | Zhao | H04N 19/70 |
| 11,438,663 B1 * | 9/2022 | Rathi | H04N 21/8456 |

(Continued)

FOREIGN PATENT DOCUMENTS

| | | |
|---|---|---|
| CN | 106817721 A | 6/2017 |
| WO | 2021032706 A1 | 2/2021 |
| WO | 2023091903 A1 | 5/2023 |

OTHER PUBLICATIONS

3GPP TS 26.247, "Transparent end-to-end Packet-switched Streaming Service, (PSS); Progressive Download and Dynamic Adaptive Streaming over HTTP (3GP-DASH)" (Release 17) (2022) (143 pages).

(Continued)

*Primary Examiner* — Melvin H Pollack
(74) *Attorney, Agent, or Firm* — HALEY GUILIANO LLP

(57) ABSTRACT

Systems and methods are described for identifying a first network (associated with an edge server comprising a cache) and a second network available to a user equipment device. A request to access at least a portion of a media asset may be received from the user equipment device. In response to determining that the at least a portion of the media asset is not stored in the cache, a determination may be made whether the edge server, via the first network, or whether the user equipment device, via the second network, should obtain such at least a portion of the media asset. Such at least a portion of the media asset may be obtained using the selected server via the first network or using the selected user equipment device via the second network, caused to be stored at the cache, and generated for display at the user equipment device.

20 Claims, 7 Drawing Sheets

A streaming assistance and distributed edge cache update system.

(56) References Cited

U.S. PATENT DOCUMENTS

| | | | |
|---|---|---|---|
| 11,496,809 B2* | 11/2022 | Li | H04N 21/44 |
| 11,568,242 B2* | 1/2023 | Guven Kaya | G06F 9/547 |
| 11,570,042 B2* | 1/2023 | Sharma | H04L 41/12 |
| 11,570,227 B2* | 1/2023 | Hinds | H04L 65/70 |
| 11,632,411 B2* | 4/2023 | Sodagar | H04L 65/65 709/231 |
| 11,641,511 B2* | 5/2023 | Jenkins | G06F 3/013 725/10 |
| 11,659,015 B2* | 5/2023 | Long | G06Q 20/223 709/231 |
| 2013/0007186 A1 | 1/2013 | Liu et al. | |
| 2015/0180995 A1 | 6/2015 | Hofmann | |
| 2020/0228582 A1 | 7/2020 | Houze et al. | |
| 2020/0285788 A1* | 9/2020 | Brebner | G06F 30/13 |
| 2021/0021907 A1* | 1/2021 | Boliek | H04N 21/632 |
| 2021/0021988 A1* | 1/2021 | Boliek | H04L 65/612 |
| 2021/0112292 A1* | 4/2021 | Sivaramalingam | H04N 21/8456 |
| 2021/0127147 A1* | 4/2021 | Shin | H04N 21/4312 |
| 2021/0185368 A1* | 6/2021 | Hao | H04N 21/2393 |
| 2022/0030308 A1 | 1/2022 | Bentaleb et al. | |
| 2022/0191592 A1* | 6/2022 | Gairuboina | H04L 65/612 |
| 2022/0256213 A1* | 8/2022 | Panagos | H04N 21/2662 |
| 2022/0272136 A1* | 8/2022 | Trim | H04L 67/1076 |
| 2022/0300503 A1* | 9/2022 | Neugebauer | G06F 16/2379 |
| 2022/0303331 A1* | 9/2022 | Svennebring | H04N 21/64738 |
| 2022/0368929 A1* | 11/2022 | Drugeon | H04N 19/31 |
| 2022/0400295 A1* | 12/2022 | Bogatin | H04N 21/26258 |
| 2023/0041829 A1* | 2/2023 | Godsey | H04N 21/2387 |
| 2023/0055511 A1* | 2/2023 | Dave | H04L 41/12 |
| 2023/0069938 A1* | 3/2023 | Bharti | H04L 63/12 |
| 2023/0138668 A1* | 5/2023 | Decrop | G06F 21/62 707/694 |
| 2023/0149819 A1* | 5/2023 | Pandhare | A63F 13/86 709/217 |
| 2023/0171313 A1* | 6/2023 | Ghosh | G16Y 10/25 709/226 |

OTHER PUBLICATIONS

Fecheyr-Lippens, "A review of http live streaming," Internet Citation, (2010) (30 pages).

Ford et al., "Architectural guidelines for multipath TCP development". IETF, Informational RFC, 6182, pp. 1-28. (2011) (https://www.rfc-editor.org/rfc/rfc6182).

ISO/IEC, "Information technology—Dynamic adaptive streaming over HTTP (DASH)—Part 1: Media presentation description and segment formats". ISO/IEC 23009-1:2019 (windows.net) (pages).

Stockhammer, "Dynamic Adaptive Streaming over HTTP—Design Principles and Standards," in ACM MMSys'11, San Jose, CA, pp. 133-144 (2011).

Thomas et al., "Enhancing MPEG dash performance via server and network assistance", IET Conference Proceedings, pp. 1-8 (2015).

Mohan et al. "Active and Passive Network Measurements: A Survey", in International Journal of Computer Science and Information Technologies, vol. 2 (4), 2011, pp. 1372-1385.

DASH-IF Position Paper: Server and Network Assisted DASH (SAND) (2016) (20 pages).

International Search Report and Written Opinion dated Dec. 1, 2023 in connection with PCT/2023/028827.

* cited by examiner

A streaming assistance and distributed edge cache update system.

The flowchart for decision how the segment is retrieved.

An example how segments are downloaded from public networks 1-3 and updated to edge server cache and UEs buffers.

SYSTEMS AND METHODS FOR DISTRIBUTED MEDIA STREAMING

BACKGROUND

This disclosure is directed to systems and methods for selecting which device and/or network should be used to obtain a portion of a media asset. In particular, a determination may be made whether an edge server should obtain the portion of the media asset via a first network, or whether a user equipment device should obtain the portion of the media asset via a second network.

SUMMARY

Many users have become accustomed to accessing high-quality media from a variety of devices. Such media is commonly delivered to users in temporally segmented form, for instance using adaptive streaming techniques such as Dynamic Adaptive Streaming over HTTP (DASH) or HTTP Live Streaming. The order and quality of the segments may be defined in a manifest file, and the segments may be individually requested by a client device. The media content may be made available in short media segments at different qualities (bitrates), to enable a client to optimize a user's viewing experience by matching the quality of requested video segments against fluctuating network conditions. The media content is commonly delivered using content delivery networks (CDNs), which cache media segments from the content server (origin) to edge servers. In mobile networks, the edge server can be located close to the base station in multi-access edge computing (MEC) to improve service latency and quality as well as to ensure efficient networking. The client device requests a video segment from the edge server, which distributes it to the client. If the segment is not available in the edge server, the edge server requests the segment from the origin and forwards it to the client. The edge server may store the requested data for a certain time according to caching rules.

The client device may have multiple network interfaces, allowing simultaneous connections over, e.g., a mobile (cellular) network and another network (public/private Wi-Fi or private cellular). In some circumstances, private networks may have low throughput to the Internet due to a weak backhaul connection. For instance, backhaul connection to the Internet may be established using a mobile network, limited local area network (LAN), or satellite connection, where the connectivity may be limited, or vary (e.g., in a vehicle or free-Wi-Fi scenario in a public place such as a hotel or restaurant). For example, mobile network capacity may vary particularly in sparsely populated areas or in rural areas, which can degrade the service and video quality. In addition, mobile network operators (MNOs) often provide unlimited data plans, which may increase the load of a cellular network (e.g., LTE, 5G) such as in urban areas. LAN networks may be used to provide backhaul connection, for example, from free Wi-Fi in restaurants, coffee shops, vehicles, etc. Traffic peaks may occur when large groups of people access popular streaming content simultaneously. Consumers are using more and more live media services on mobile devices, and they are expecting to receive high-quality video regardless of their location. More and more of such consumption is done when the user is on the go, e.g., travelling while connected to an available network in restaurant, airport or in a vehicle like a bus, train, or boat. However, when multiple users are streaming the same content at the same time, backhaul network capacity may be insufficient, which can cause a variety of problems. For example, users may be forced to utilize the mobile or cellular network on their mobile devices, or may experience a low quality of experience (QoE) due to stalls and substantial quality fluctuation in a video session. In addition, unnecessary bandwidth and energy consumption may occur if the same segments are streamed several times by the same user or multiple users, which is burdensome for service providers, MNOs, and client devices. This may result in user frustration directed towards network operators as well as service providers.

To overcome these problems, systems and methods are provided herein for identifying a first network and a second network available to a user equipment device, wherein the first network is associated with an edge server comprising a cache. The systems and methods may receive, from the user equipment device, a request to access at least a portion of a media asset, and determine whether the at least a portion of the media asset is stored in the cache. In response to determining that the at least a portion of the media asset is not stored in the cache, the systems and methods may perform a determination. For example, such determination may be whether the edge server should be selected to obtain the at least a portion of the media asset via the first network from a content server or whether the user equipment device should be selected to obtain the at least a portion of the media asset via the second network from the content server. The systems and methods may cause the at least a portion of the media asset to be obtained using the selected edge server via the first network or using the selected user equipment device via the second network, and cause the obtained at least a portion of the media asset to be stored at the cache. The systems and methods may cause the obtained at least a portion of the media asset to be generated for display at the user equipment device.

Such aspects may provide a dynamic, flexible system in which streaming of media content to a client device can be optimized to exploit multiple alternative network connections of different devices. For example, a first network associated with a particular environment (e.g., a train Wi-Fi network having an edge server) may be used to provide media to users (e.g., commuters on the train). However, the systems and methods provided herein may determine, based on network characteristics, that such edge server is currently unable to provide high-quality media segments. The systems and methods may instead cause a user equipment device (e.g., of a user commuting on the train) to download or otherwise obtain one or more segments of the media asset via a second network (e.g., a cellular network of his or her mobile device), and provide such segment(s) to the edge server for storage at the cache. In this way, computing and/or network resources required to obtain certain segments of the media asset may be distributed between user equipment device(s) and edge server(s), which may result in the devices, network and/or service providers consuming less computing and/or network resources. Moreover, users may be provided with higher-quality media assets in an efficient manner, to preserve a high-quality user media streaming experience.

In some aspects of this disclosure, the user equipment device is a first user equipment device, and the systems and methods described herein may be further configured to receive, from a second user equipment device, a request to access the at least a portion of the media asset. Determining whether the edge server should be selected to obtain the at least a portion of the media asset via the first network or whether the first user equipment device should be selected to obtain the at least a portion of the media asset via the second network may comprise a further determination. Such further determination may correspond to determining whether the second user equipment device should be selected to obtain the at least a portion of the media asset via the second network. In such example, causing the at least a portion of the media asset to be obtained may be performed using the selected edge server via the first network or using the selected first user equipment device via the second network or using the selected second user equipment device via the second network.

In some embodiments, the first network is a localized private network, and the second network is a cellular network, and each of the first user equipment device and the second user equipment device may be located in a physical environment associated with the localized private network. The obtained at least a portion of the media asset may be provided to the cache by the selected edge server and may be provided from the cache to at least one of the first user equipment device or the second user equipment device via the localized private network. Alternatively, the obtained at least a portion of the media asset may be provided to the edge server by the selected first user equipment device or by the selected second user equipment device via the localized private network.

In some aspects of this disclosure, causing the obtained at least a portion of the media asset to be stored to the cache is performed based at least in part on determining that the at least a portion of the media asset is likely to be requested by another user equipment device in the physical environment associated with the localized private network.

In some embodiments, causing the obtained at least a portion of the media asset to be stored to the cache is performed based at least in part on determining that the media asset is being provided to a plurality of user equipment devices in the physical environment associated with the localized private network.

In some aspects of this disclosure, the media asset is a live broadcast, and causing the obtained at least a portion of the media asset to be stored to the cache is performed based at least in part on determining that the user equipment device is likely to request that a trick-play operation be performed on the at least a portion of the media asset.

In some embodiments, the at least a portion of a media asset is a first portion of the media asset, and the systems and methods may further comprise receiving, from the user equipment device, a request to access a second portion of a media asset. In response to determining that the second portion of the media asset is not stored in the cache, such systems and methods may determine whether the edge server should be selected to obtain the second portion of the media asset via the first network or whether the user equipment device should be selected to obtain the second portion of the media asset via the second network. The systems and methods may cause the second portion of the media asset to be obtained using the selected edge server via the first network or using the selected user equipment device via the second network. In some embodiments, the selected one of the edge server or user equipment device used to obtain the first portion of the media asset is different from the selected one of the edge server or user equipment device used to obtain the second portion of the media asset.

In some aspects of this disclosure, the user equipment device is a first user equipment device, and the method further comprises selecting the first user equipment device to obtain the at least a portion of the media asset via the second network, and causing the first user equipment device to provide the at least a portion of the media asset to the edge server via the first network.

In some embodiments, determining whether the edge server should be selected to obtain the at least a portion of the media asset via the first network or whether the user equipment device should be selected to obtain the at least a portion of the media asset via the second network comprises determining network characteristics. For example, the system may be further configured to determine network characteristics associated with the first network, and determine network characteristics associated with the second network. In some embodiments, selecting either the edge server to obtain the at least a portion of the media asset via the first network, or the user equipment device to obtain the at least a portion of the media asset via the second network, is based at least in part on the determined network characteristics. For example, the selection may be based at least in part on the determined network characteristics associated with the first network and the determined network characteristics associated with the second network.

In some aspects of this disclosure, identifying the second network available to the user equipment device comprises receiving, at the edge server, an indication from the user equipment device specifying the second network and indicating a portion of the second network allocated for use in association with the edge server.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
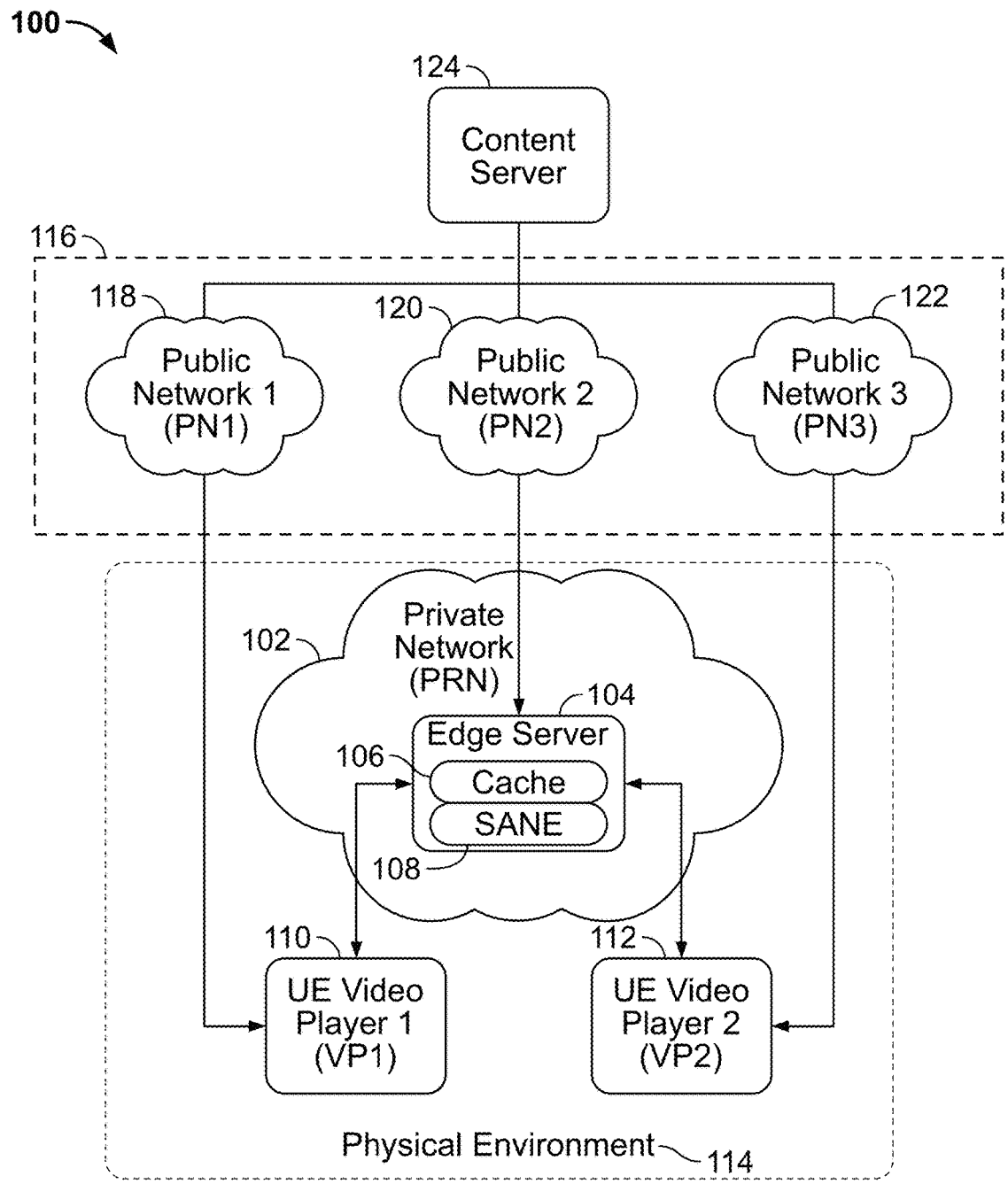
FIG. 1 shows an illustrative system for selecting a device and/or network by which to obtain at least a portion of a media asset, in accordance with some embodiments of this disclosure.

FIG. 1 shows an illustrative system 100 for determining which device should be used to obtain at least a portion of a media asset via a particular network, in accordance with some embodiments of this disclosure. System 100 may correspond to a streaming assistance system in which a cache may be updated based on utilizing network connections in multiple devices connected to the different networks, to optimize video streaming when network connectivity to a content server or content delivery network (CDN) is limited, or otherwise varies. System 100 may include a first network, e.g., private network (PRN) 102, which may comprise or otherwise be associated with one or more edge servers 104. Edge server 104 may provide edge services for users, and may comprise cache 106, for storing media assets and/or portions of media assets, and streaming assistance network element (SANE) 108, which may correspond to or otherwise be configured to implement a streaming assistance application. In some embodiments, the streaming assistance application may be configured to execute at least in part on one or more of edge server 104 and/or one or more remote servers (e.g., content server 124 and/or server 604 of FIG. 6) and/or one or more of user equipment devices 110 and/or 112, or any other suitable device, or any combination thereof. The streaming assistance application may be configured to perform the functionalities described herein. In some embodiments, the voice processing system may be offered as an add-on application, e.g., installed on any networking equipment, computing device, mobile device, edge server and/or any other suitable device that may be present or included in physical environment 114. Additionally or alternatively, certain functionalities provided by the streaming assistance application may be provided via an Application Programming Interface (API). While a single edge server 104 and a single content server 124 are shown in FIG. 1, it should be appreciated that any suitable number of edge servers and content servers may be utilized, and computing tasks may be distributed across such respective groups of servers.

In some embodiments, cache 106 may be populated based on requests from users either using one or more backhaul connections of network 102 or by way of, e.g., a mobile network connection of user equipment device 110 and/or 112 to network 116. System 100 may be configured to select one or more of an access network(s) from a plurality of access networks available to the user equipment included in system 100 and access networks from system 100 to route particular media data flows (e.g., media assets, segments or partial segments) to the edge server and clients. As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), augmented reality content, virtual reality content, video clips, audio, playlists, websites, articles, electronic books, blogs, social media, applications, games, and/or any other media or multimedia, and/or combination of the above.

System 100 may include user equipment device 110 and user equipment device 112 and/or any suitable number or types of user equipment devices, which may also be configured to implement the streaming assistance application, and may be capable of communicating with edge server 104 by way of first network 102. User equipment device 110 and user equipment device 112 may correspond to any suitable device(s), such as, for example, a mobile device (e.g., smartphone, tablet, smart watch, and/or any other suitable mobile device), Internet of Things (IoT) devices, a biometric device; a desktop computer, laptop computer, virtual reality (VR) device; augmented reality (AR) device, and/or any other suitable device(s).

In some embodiments, first network 102, including edge server 104, as well as user equipment devices 110 and 112 may be located at a same physical environment 114. Physical environment 114 may be a particular physical location, such as, for example, a household, a place of business (e.g., a restaurant, a café, a coffee shop, an airport, or any other suitable place of business or any suitable combination thereof, which may offer free Wi-Fi or charge a user to access Wi-Fi or another network); a vehicle (e.g., an automobile or any other suitable vehicle, which may be on the move or stationary) and/or a common carrier (e.g., a train, an airplane, a bus, a boat, or any other suitable common carrier, or any combination thereof); a library; an office; a school; other organization or any other suitable location, or any combination thereof. In some embodiments, first network 102 may be a localized network, e.g., a home network, a business network, an in-vehicle network, a network provided in public transportation or a common carrier, or any other suitable network, or any combination thereof. In some embodiments, first network 102 may be facilitated at least in part by networking equipment on the premises of physical environment 114.

In some embodiments, user equipment device 110 and user equipment device 112 may be equipped with antennas for transmitting and receiving electromagnetic signals at frequencies within the electromagnetic spectrum, e.g., radio frequencies, to communicate over first network 102 with edge server 104. First network 102 may correspond to, e.g., a Wi-Fi network, such as, for example, 802.11n, 802.11ac, 802.11ax, or Wi-Gig/802.11ad, and the devices of environment 114 may communicate wirelessly over a wireless Local Area Network (WLAN) and with the Internet, and may be present within an effective coverage area of the localized network. The Internet may include a global system of interconnected computer networks and devices employing common communication protocols, e.g., the transmission control protocol (TCP), user datagram protocol (UDP) and the internet protocol (IP) in the TCP/IP internet protocol suite. In some embodiments, the devices of environment 114 may additionally or alternatively be configured to communicate via a short-range wired or wireless communication technique (e.g., Bluetooth, RFID, NFC, or any other suitable technique, or any combination thereof). In some embodiments, a backhaul connection from first network 102 to the Internet (and content server 124) may be based at least in part on a mobile or cellular network.

In some embodiments, first network 102 and/or physical environment 114 may comprise one or more routers configured to forward data packets from the Internet connection, received by way of a modem, to devices within first network 102 and receive data packets from such devices. In some embodiments, the router may include a built-in modem to provide access to the Internet, built-in switches or hubs to deliver data packets to the appropriate devices within first network 102, built-in access points to enable devices to wirelessly connect to first network 102. In some embodiments, system 100 may include one or more stand-alone modems, switches, routers and access points. In some embodiments, first network 102 may comprise additional routers or network equipment positioned at various locations of physical environment 114 and in communication with the router to extend a range of the network, e.g., to more remote region of physical environment 114. In some embodiments, media assets may be provided to user equipment devices 110 and/or 112 by way of wired and/or wireless signals transmitted through first network 102, and the streaming assistance application may monitor wired and/or wireless signal or network characteristics of first network 102 and/or second network 116.

System 100 may include second network 116, which may correspond to one or more of public networks 118, 120 and 122. System 100 may comprise one or more content servers 124, which may be configured to provide, e.g., over first network 102 and/or second network 116, a media asset and/or portions thereof to user equipment devices 110 and/or 112 and/or edge server 104. In some embodiments, second network 116 may comprise a public mobile network provided by a mobile network operator (MNO) or MVNOs (mobile virtual network operators), where the MNO may own the network and delivers services to subscribers, and may also sell access to network services to the MVNOs who can deliver the services for their own subscribers. Such MVNOs may not own the network and may pay a fee to the MNO based on tonnage/usage by their subscribers, and a subscriber may connect his or her device to second network 116 using an e-sim or sim provided by MNO or MVNO. In some embodiments, user equipment devices 110 and 112 can be configured to concurrently connect to first network 102 and second network 116. For example, multiple client devices may be connected to a Wi-Fi network (e.g., 802.11n, 802.11ac, 802.11ax) which may correspond to first network 102, and may also be connected to a cellular network (e.g., LTE, 5G) or a satellite network or any other suitable network which may correspond to second network 116. In some embodiments, system 100 may utilize Multipath TCP (MPTCP) techniques for utilizing multiple access network connections simultaneously. While first network 102 and second network 116 are described in the example of FIG. 1, it should be appreciated that any suitable number of networks may be employed in system 100.

In an illustrative scenario, physical environment 114 may correspond to a train, on which devices of each of multiple users, such as, for example, users of receptive user equipment devices 110 and 112, are connected to first network 102 and second network 116. For example, such users may be passengers on the train at the same time, e.g., commuting to work. First network 102 may be a private network (e.g., Wi-Fi or private 5G or any other suitable network or any combination thereof) offering an edge service for media delivery, e.g., by way of the streaming assistance application which may provide caching capability at cache 106. The users of user equipment devices 110 and 112 may request to view the same media asset, e.g., a live sports broadcast or a live news broadcast or VOD content, provided via the Internet, from content server 124. The streaming assistance application may monitor connection quality (e.g., throughput, latency, jitter, or any other network characteristic, or any combination thereof) from physical environment 114 to the Internet via network 102, which may vary. Such varying network characteristic(s) may result in, for at least some segments of the media asset, edge server 104 being unable to populate high-quality media segments to cache 106 and guarantee a high QoE for the users. In such instance, the streaming assistance application may cause user equipment device 110 or 112 to download or otherwise obtain one or more segments of the media asset via second network 116 (e.g., a cellular network), and provide such segment(s) to edge server 104 for storage at cache 106. In this way, computing and/or network resources required to obtain certain segments of the media asset may be distributed between user equipment devices 110 and/or 112, and edge server 104, which may result in the devices, network providers and/or service providers consuming less computing and/or network resources. For example, the streaming assistance application may dynamically select, based on current network conditions or device conditions, which of first network 102 (e.g., via edge server 104) or second network 116 (e.g., via equipment devices 110 and/or 112), or other suitable networks or devices, should be used to obtain a particular segment. In some embodiments, when first network 102 is selected, cache 106 may be populated using a backhaul connection (e.g., satellite, 4G, 5G or LAN or any other suitable network, or any combination thereof) of first network 102.

In some embodiments, in monitoring network characteristics of first network 102 and/or second network 116, the streaming assistance application may perform any suitable technique. As an example, the streaming assistance application may monitor the quality of the available public or private networks and/or Wi-Fi uplink and downlink capacity using passive and/or active network estimation techniques, e.g., to function similarly as a radio network information service (RNIS) or utilize such a service from another network node. In some embodiments, signal quality indicators (e.g., RSSI) and packet information (e.g., response times) can be monitored and used as part of the selection process with respect to selecting the device and/or network that is to obtain a particular segment of a media asset. Additionally or alternatively, wireless signal characteristics, such as, for example, channel state information (CSI) and/or received channel power indicator (RCPI) of devices and/or networking equipment may be monitored. In some embodiments, the streaming assistance application may use information of available mobile network operator's networks, information of the connected users, and share the network usage by number of users in each MNO's network. The streaming assistance application with caching capability may determine, based on any suitable combination of such network characteristics, which network to utilize in populating the media segment to cache.

In some embodiments, an operating system of user equipment devices 110 and/or 112 may provide to the streaming assistance application information concerning device characteristics of user equipment devices 110 and/or 112 and/or network characteristics of first network 102 and second network 116. For example, the streaming assistance application information may receive one or more indications of a battery level of the user equipment device, a cellular network and/or a strength of cellular network signals being received by the user equipment device, an indication of a Wi-Fi network and/or Wi-Fi signal strength of signals received by the user equipment device, and/or any other suitable data. Such data may be requested by or otherwise transmitted to edge server 104 at any suitable interval. In some embodiments, the streaming assistance application may monitor signal strength of received and transmitted signals, resolution of video or other display characteristics of a media asset being generated for display at user equipment device 110 and/or 112. In some embodiments, the streaming assistance application may monitor one or more quality-of-service characteristics (e.g., available bandwidth, error rate, bit rate, throughput lag, transmission delay, availability, or jitter, or any other suitable network characteristic, or any combination thereof) experienced by user equipment device 110 and/or 112, and/or any other suitable parameters. For example, any suitable characteristic may be associated with a particular threshold, and the value of the network or device characteristic may be compared to such threshold, which may be taken into account in selecting a device and/or network that is to obtain a particular segment of the media asset. In some embodiments, the streaming assistance application may take into account any of such characteristics in selecting a device and/or network that is to obtain a particular segment of the media asset.

Figure 2:
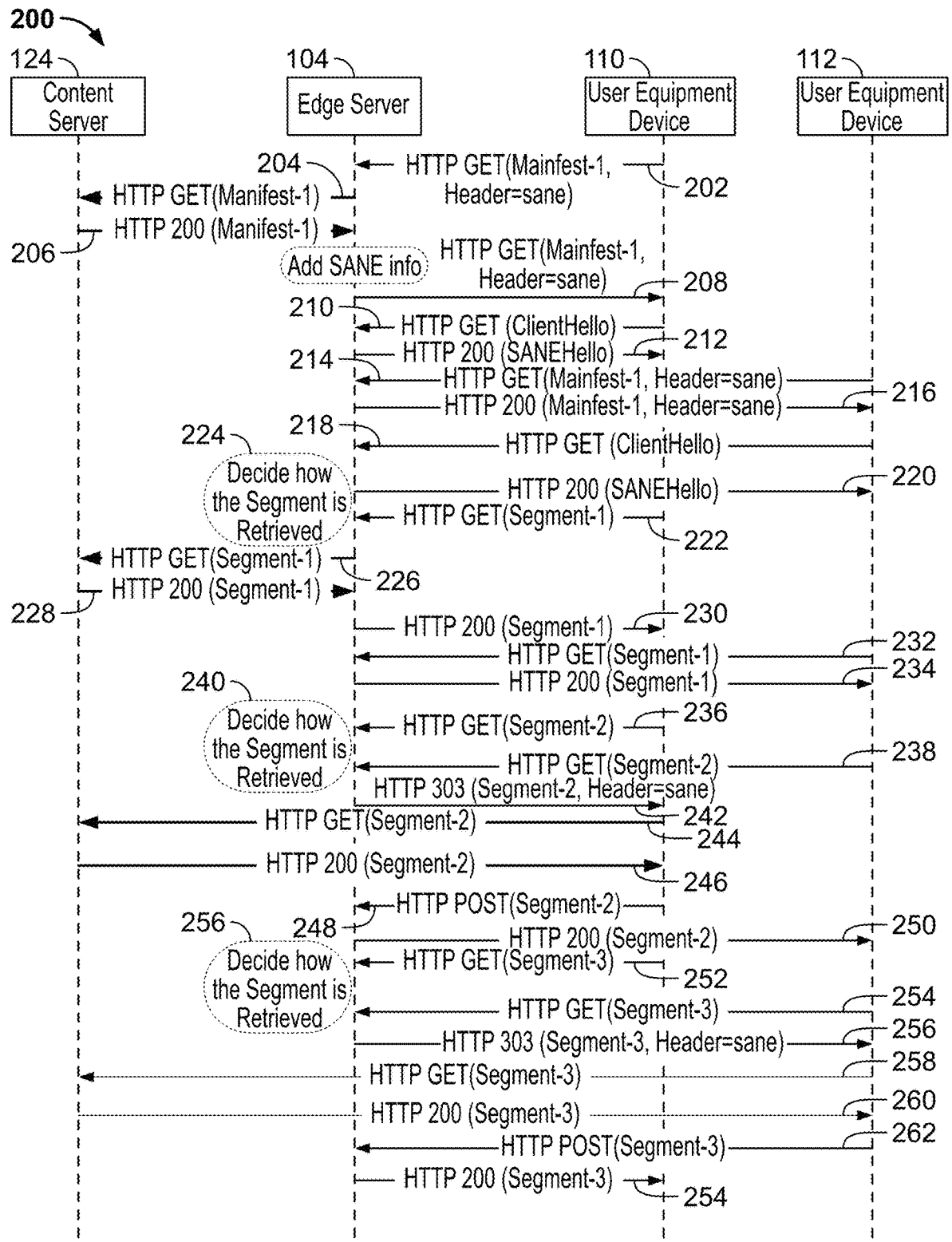
FIG. 2 is a flowchart of a detailed illustrative process for selecting a device and/or network by which to obtain at least a portion of a media asset, in accordance with some embodiments of this disclosure.

FIG. 2 is a flowchart of a detailed illustrative process 200 for selecting a device and/or network by which to obtain at least a portion of a media asset, in accordance with some embodiments of this disclosure. Process 200 may enable implementing a distributed cache update, with respect to the media asset, and/or portions or segments thereof, being consumed and/or requested in a particular physical environment 114. The streaming assistance application may be installed at or otherwise provided to edge server 104, user equipment device 110 having a video player 1 (VP1), and user equipment device 112 having a video player 2 (VP2). For example, edge server 104 in first network 102 may be instrumented with the streaming assistance application server software, and user equipment device 110 and user equipment device 112 may be instrumented with the streaming assistance application client software.

At 202, user equipment device 110 may connect to first network 102 and initiate playing of a media asset by requesting a manifest file. In some embodiments, such request may be an HTTP request, and may include in a header an indication that user equipment device 110 supports the streaming assistance application.

As referred to herein, the term "manifest" should be understood to refer to a file and/or a data structure containing information about sequential segments (comprising sequential frames) of a media asset available to a client device, such as, for example, user equipment device 110. Such information may include, e.g., a number of segments in a playlist, bit rates of each segment, codecs associated with each segment, resolution of each segment, timing of each segment, location on the network where a segment may be retrieved, bandwidth of each segment, video tracks of each segment, audio tracks of each segment, subtitle tracks of each segment, captions of each segment, languages of each segment, other metadata associated with each segment, and/or any other suitable information. The manifest may be employed in any of a variety of streaming protocols, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), and/or manifest files for Microsoft Smooth Streaming (MSS), etc. The manifest may be a standard manifest (e.g., an MPD file from MPEG-DASH) or may be a modified version of a standard manifest. A segment may comprise information (e.g., encoded video, audio, subtitle information, error correction bits, error detection bits, etc.) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., from one second to a few seconds). In some embodiments, the manifest may be an XML file. In some embodiments, the manifest may include an indication, for a particular segment, of a particular device (e.g., edge server 104, user equipment device 110, and/or user equipment device 112) and/or network (e.g., network 102 and/or network 116) by which at least a particular segment of a media asset should be obtained.

At 204, edge server 104 may request the manifest file from content server 124. At 206, edge server 104 may receive the requested manifest file from content server 124 and forward such manifest file to user equipment device 110 (at 208). In some embodiments, the streaming assistance application of edge server 104 may add identifying information in a header, e.g., an IP address of edge server 104 indicating where to send messages associated with the streaming assistance application, when forwarding the manifest to user equipment device 110. In some embodiments, edge server 104 may add a universal resource identifier (URI) of edge server 104 to the manifest file.

At 210, user equipment device 110 may send a ClientHello message comprising an indication of available public networks (e.g., identifying one or more available second networks 116) to edge server 104. Such indication may additionally include an indication of which share of such network(s) is allocated for use by the streaming assistance application. At 212, edge server 104 may acknowledge receipt of such ClientHello message received at 210. In some embodiments, at 212, edge server 104 may store the network information received at 210 and transmit a confirmation regarding whether it has reserved the allocated portion of the one or more available second networks 116 for the purposes of the streaming assistance application.

At 214, user equipment device 112 may connect to first network 102 and initiate playing of a media asset by requesting a manifest file. In some embodiments, such request may be an HTTP request, and may include in a header an indication that user equipment device 112 supports the streaming assistance application. In some embodiments, the media asset requested by user equipment device 112 may be the same media asset that was requested by user equipment device 110. In some embodiments, each of user equipment device 110 and 112 may be located in the same physical environment 114 (e.g., a train). The media asset may be, e.g., live broadcast content or VOD content.

At 216, edge server 104 may forward the manifest file (obtained at 206 from content server 124) to user equipment device 112. In some embodiments, the streaming assistance application of edge server 104 may add identifying information in a header, e.g., an IP address of edge server 104 indicating where to send messages associated with the streaming assistance application, when forwarding the manifest to user equipment device 112. In some embodiments, edge server 104 may add a universal resource identifier (URI) of edge server 104 to the manifest file.

At 218, user equipment device 112 may send a ClientHello message comprising an indication of available public networks (e.g., identifying one or more available second networks 116) to edge server 104. Such indication may additionally include an indication of which share of such network(s) is allocated for use by the streaming assistance application. At 220, edge server 104 may acknowledge receipt of such ClientHello message received at 218. In some embodiments, at 220, edge server 104 may store the network information received at 218 and transmit a confirmation regarding whether it has reserved the allocated portion of the one or more available second networks 116 for the purposes of the streaming assistance application.

At 222, user equipment device 110 may, based on the received manifest file, request a particular segment (e.g., segment-1) of the media asset from edge server 104 in first network 102. In some embodiments, any suitable adaptive streaming technique may be employed for requesting and providing the media segments. For example, the adaptive streaming technique may be DASH, and SANE 108 may be a DANE (DASH-aware Network Element).

At 224, the streaming assistance application, running at least in part at edge server 104, may decide how the requested segment or portion of the media asset is to be retrieved. For example, at 224, the streaming assistance application may perform process 300 shown in FIG. 3.

Figure 3:
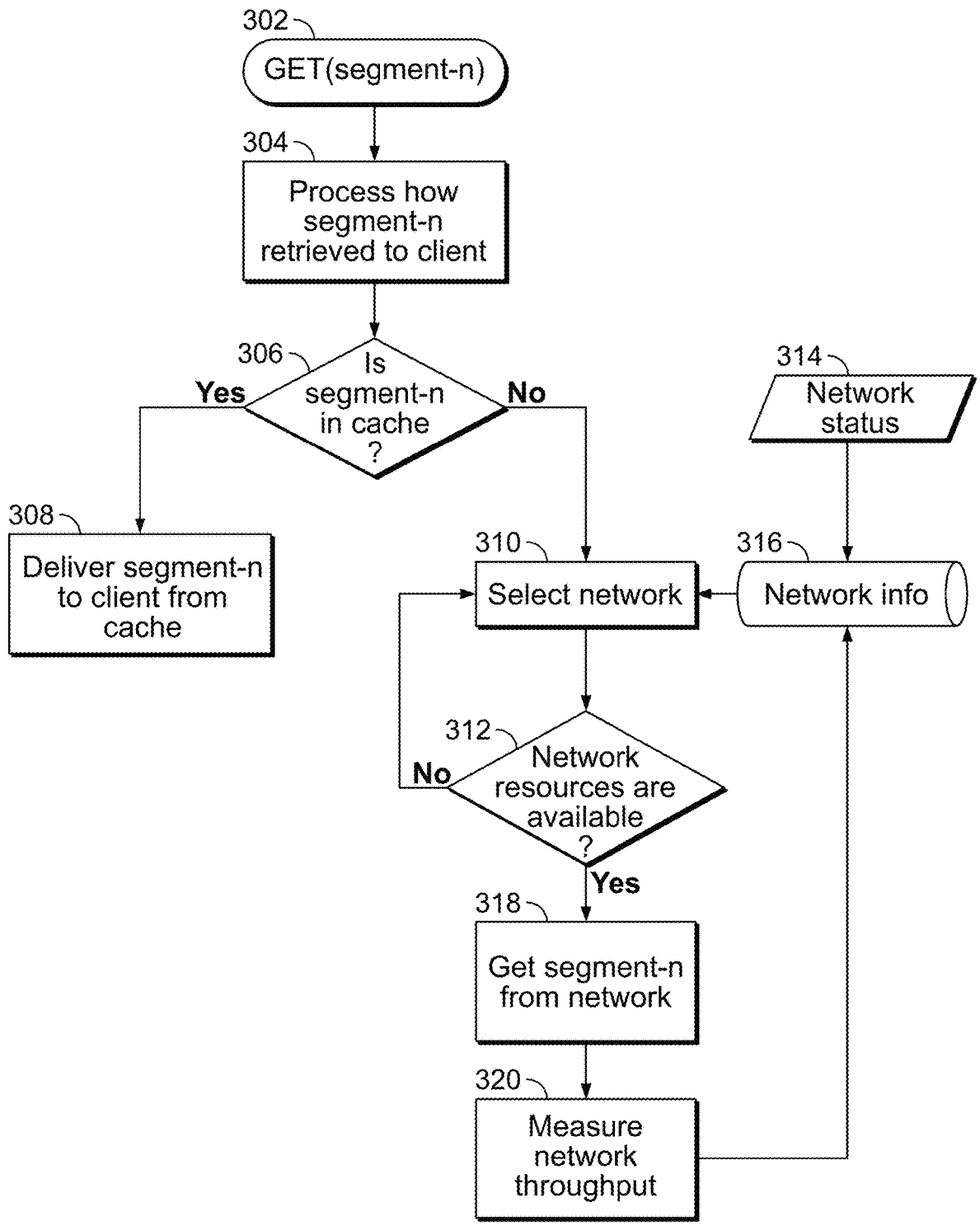
FIG. 3 is a flowchart of a detailed illustrative process for selecting a device and/or network by which to obtain at least a portion of a media asset, in accordance with some embodiments of this disclosure.

FIG. 3 is a flowchart of a detailed illustrative process 300 for selecting a device and/or network by which to obtain at least a portion of a media asset, in accordance with some embodiments of this disclosure. At 302, the streaming assistance application may determine that a request, from a user equipment device (e.g., user equipment device 110), to access at least a portion of a media asset has been received. At 304, which may correspond to the determination at 224, the streaming assistance application may determine how the requested segment or portion of the media asset is to be retrieved. For example, at 306, the streaming assistance application may determine whether the requested segment is already stored at cache 106. If such requested segment is already stored at cache 106, processing may proceed to 308, and edge server 104 may provide the segment stored at cache 106 to the requesting user equipment device over first network 102. On the other hand, if the streaming assistance application determines at 306 that the requested segment is not stored in cache 106, processing may proceed to 310.

At 310, the streaming assistance application may perform processing to select an optimal network for obtaining the requested portion of the media asset, to facilitate efficient usage of computing resources and high-quality media streaming. The streaming assistance application may determine network availability (at 312), quality of service (QoS) metrics at 314, bandwidth estimate techniques may be employed, or any other suitable network characteristic or network status information or other tools may be employed, or any combination thereof. In some embodiments, such information may be stored at network information database 316 and/or at edge server 104 and/or at content server 124. In some embodiments, network information database 316 may be located at physical environment 114, within edge server 104 or remote from edge server 104 and in communication with edge server 104 over a network. In some embodiments, the streaming assistance application may determine such information by the monitoring network traffic and/or receiving information indicating current or projected network characteristics. In some embodiments, the streaming assistance application may estimate a transmission quality in each of networks 102 and 116 (and/or public networks 118, 120, and 122), based on a video segment received through the respective network. In some embodiments, the streaming assistance application may collect external network status information provided by connected user equipment devices or an RNIS.

Based on the aforementioned information, the streaming assistance application may, at 318, determine to fetch the segment from content server 124 via PN2 120 (e.g., by way of edge server 104 of first network 116). Alternatively, the streaming assistance application may request user equipment device 110 to fetch the segment from content server via PN1 118, and may request that user equipment device 110 upload such retrieved segment to cache 106 by way of first network 102. Alternatively, the streaming assistance application may request user equipment device 112 to fetch the segment from content server via PN3 122, and may request that user equipment device 112 upload such retrieved segment to cache 106 by way of first network 102. In some embodiments, the streaming assistance application (e.g., at least a portion of which may be executing at SANE 108 at edge server 104) may determine to split the segment request among multiple user equipment devices. For example, the streaming assistance application may request segment header information from content server 124, and upon determining that content server 124 supports range requests, the streaming assistance application can request that different byte ranges of the segment be retrieved by the multiple user equipment devices. In some embodiments, the streaming assistance application may request a particular bitrate and/or resolution for a particular segment, which may be specified in the manifest file, based on the monitored network characteristics.

In some embodiments, a particular network may be selected to obtain the segment if network availability indicates the network is available and QoS metrics and/or connection quality of one or more of PN1 118, PN2 120, PN3 122 and/or one or more of second network(s) 116, indicate delivery of such segment would be enabled. For example, SANE may estimate a transmission quality in each network based on a video segment received through one or more of second network(s) 116. The streaming assistance application may leverage the capacity of each of the networks described in system 100 of FIG. 1, and/or any other suitable networks available to system 100, to obtain the best possible quality segments in an efficient manner. In some embodiments, the streaming assistance application may measure network throughput, or any other suitable network characteristic, and feedback such information to update network information database 316 with current network information.

In the example of FIG. 2, the streaming assistance application may determine, based on the determination made at 224, to obtain the requested segment from content server 124 (at 226) using edge server 104 by way of PN2 120, e.g., a backhaul connection of first network 102. Edge server 104 may store such segment (obtained at 228 from content server 124) in cache 106 and provide the obtained segment to user equipment device 110 (at 230), to enable and cause user equipment device 110 to generate for display such portion of the media asset.

At 232, edge server 104 may receive a request, e.g., via first network 102, from user equipment device 112 for the same segment of the media asset requested by user equipment device 110 at 222. Since such segment was previously stored in cache 106, the streaming assistance application may provide the segment from cache 106 to user equipment device 112 (at 234, to enable and cause user equipment device 112 to generate for display such portion of the media asset.

At 236, edge server 104 may receive a request, e.g., via first network 102, from user equipment device 110, for another segment, e.g., the next sequential segment (segment-2) of the media asset, after segment-1 having been requested at 222. Edge server 104 may additionally receive, at 238, a request for such segment-2 from user equipment device 112.

The streaming assistance application may perform a determination at 240, similar to the determination described at 224 and in FIG. 3, and as a result of such determination may decide to obtain the requested segment-2 using second network 116 and user equipment device 110. For example, the streaming assistance application may identify the combination of using user equipment device 110 and second network 116 as the optimal manner for obtaining segment-2, as compared to utilizing edge server 104, user equipment device 112 or any other suitable user equipment device, and a particular accompanying network. Specifically, the streaming assistance application may determine to utilize user equipment device 110's PN1 118 connection (e.g., a cellular network), and may instruct user equipment device 110 to obtain such segment by way of an HTTP response (at 242). Such HTTP response may comprise a header in which the streaming assistance application instructs user equipment device 110 to obtain segment-2 via PN1 118 and POST the obtained segment-2 to edge server 104, e.g., transmit the obtained segment-2 by way of first network 102 for storage at cache 106. In some embodiments, as part of the determination at 240, only user equipment devices present in physical environment 114 and requesting portions of the particular media asset associated with segment-2 may be considered as candidates for retrieving the segment. In some embodiments, any user equipment device present in physical environment 114 and requesting any content may be considered as a candidate for retrieving the segment. In some embodiments, any user equipment device present in physical environment 114 and having the streaming assistance application installed or otherwise executing thereon may be considered as a candidate for retrieving the segment. In some embodiments, users of such user equipment devices may be incentivized to lend their mobile device's bandwidth and resources for the purposes of obtaining segments by being offered access to bonus content, or accumulating points or currency for a profile with the streaming assistance application.

At 244, user equipment device 110 may request segment-2 by way of second network 116, specifically PN1 118, and, at 246, user equipment device 110 may obtain such segment-2 by way of second network 116, specifically PN1 118, to enable and cause user equipment device 110 to generate for display such portion of the media asset. In some embodiments, user equipment device 110 may store such segment to buffer memory of user equipment device 110, and transmit such segment-2 to cache 106 of edge server 104 (at 248). In some embodiments, user equipment device 110 may transmit such segment-2 to cache 106 of edge server 104 by way of an HTTP POST request method, or using any other suitable technique, or any combination thereof. At 250, edge server 104 may deliver segment-2 from cache 106 to user equipment device 112, to enable and cause user equipment device 112 to generate for display such portion of the media asset.

At 252, the streaming assistance application may receive from user equipment device 110, at edge server 104, a request for another segment of the media asset, e.g., a next sequential segment-3, after the prior segment-2 within a duration of the media asset. Edge server 104 may additionally receive, at 254, a request for such segment-3 from user equipment device 112.

At 256, the streaming assistance application may perform a determination, similar to the determinations described at 240 and 224 and in FIG. 3, and as a result of such determination may decide to obtain the requested segment-3 using second network 116 and user equipment device 112. For example, the streaming assistance application may identify the combination of using user equipment device 112 and second network 116 as the optimal manner for obtaining segment-3, as compared to utilizing edge server 104, user equipment device 110 or any other suitable user equipment device, and a particular accompanying network. Specifically, the streaming assistance application may determine to utilize user equipment device 112's PN3 122 connection (e.g., a cellular network), and may instruct user equipment device 112 to obtain such segment-3 by way of an HTTP response (at 256). Such HTTP response may comprise a header in which the streaming assistance application instructs user equipment device 110 to obtain segment-3 via PN1 118 and POST the obtained segment-3 to edge server 104, e.g., transmit the obtained segment-3 by way of first network 102 for storage at cache 106.

At 258, user equipment device 112 may request segment-3 by way of second network 116, specifically PN3 122, and, at 260, user equipment device 112 may obtain such segment-3 by way of second network 116, specifically PN3 122, to enable and cause user equipment device 112 to generate for display such portion of the media asset. In some embodiments, user equipment device 112 may store such segment to buffer memory of user equipment device 112, and transmit such segment-3 to cache 106 of edge server 104 (at 262). In some embodiments, user equipment device 112 may transmit such segment-3 to cache 106 of edge server 104 by way of an HTTP POST request method, or using any other suitable technique, or any combination thereof. At 264, edge server 104 may deliver segment-3 from cache 106 to user equipment device 110, to enable and cause user equipment device 110 to generate for display such portion of the media asset.

In some embodiments, segment(s) can be downloaded or otherwise obtained in parallel if such segment(s) are available in content server 124. In some embodiments, if a user equipment device is determined not to have support for the streaming assistance application at a current point in time, or second network 116 is unavailable, segments can be downloaded or otherwise obtained from cache 106 of edge server 104. In some embodiments, the downloading or otherwise obtaining of a particular segment may be distributed among multiple networks (e.g., 118, 120, 122, via one or more user equipment devices), e.g., using range requests.

Figure 4:
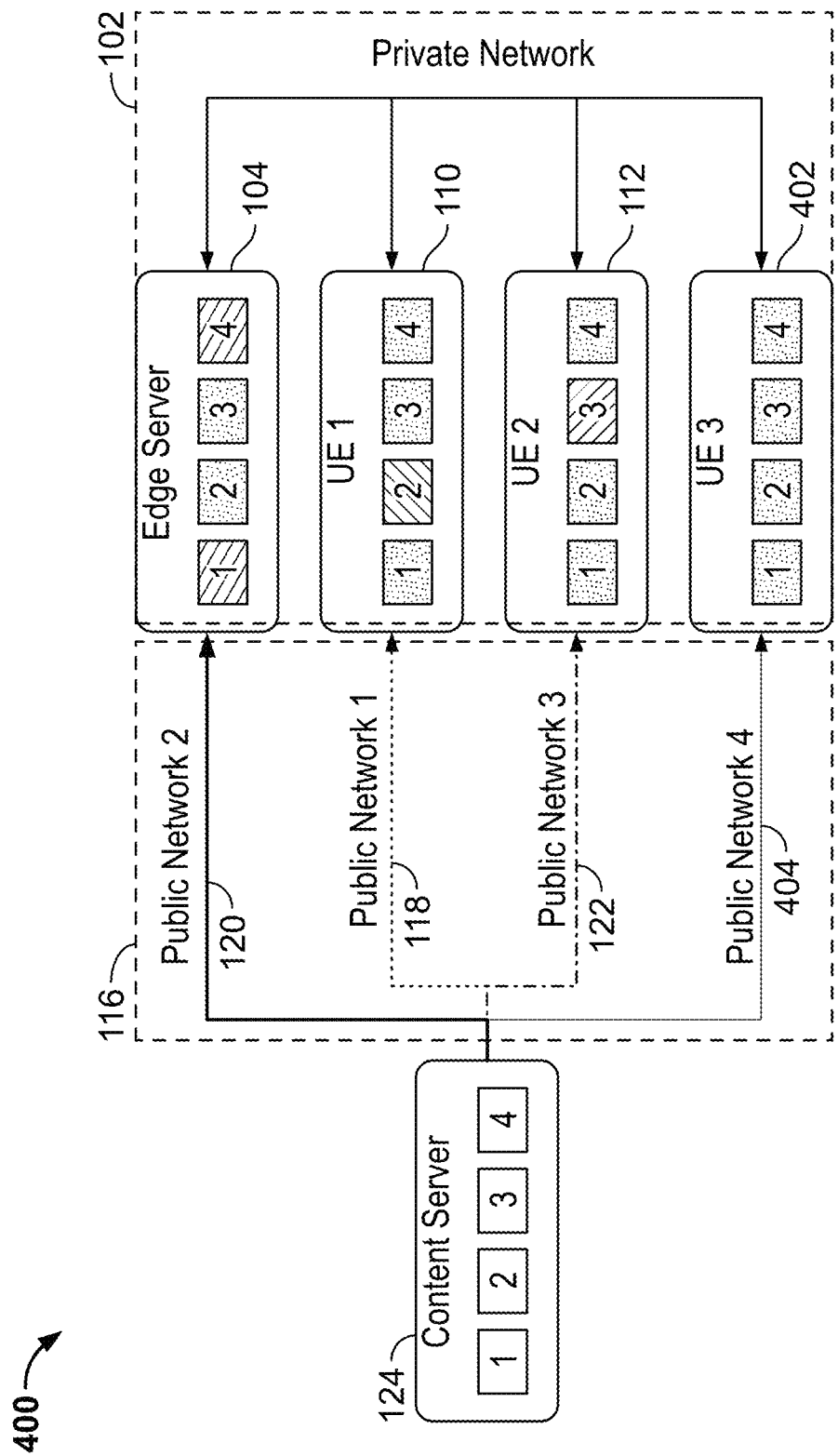
FIG. 4 is an illustrative block diagram indicating how portions of a media asset may be obtained via multiple networks, in accordance with some embodiments of this disclosure.

FIG. 4 is an illustrative block diagram 400 indicating how portions of a media asset may be obtained via multiple networks, in accordance with some embodiments of this disclosure. Content server 124 may be capable of communicating with edge server 104, user equipment device 110, user equipment device 112, and user equipment device 402 by way of second network 116. Second network 116 may comprise public network 1 (PN1) 118, PN2 120, PN3 122 and/or PN 404, and/or any other suitable network. Second network 116 may be, for example, a cellular network, a satellite network or any other suitable network or any combination thereof, and/or a backhaul network for first network 102. First network 102 may be a private network comprising edge server 104, user equipment devices 110, 112 and 402, and may correspond to a particular physical environment 114.

In the example shown in FIG. 4, segments may be streamed by way of three network links, although it should be appreciated that any other suitable number of network links may be employed. In the example of FIG. 4, PN4 404 may not be used due to the streaming assistance application determining, based on monitored network characteristics, that performance of PN4 404 is insufficient to deliver a quality media session to users, or that PN4 404 does not support the streaming assistance application. Edge server 104 may determine to retrieve segment 1 and segment 4 by way of PN2 120 of second network 116, and user equipment devices 110, 112 and 402 may stream or otherwise obtain such segments from edge server 104 via first network 102.

The streaming assistance application may instruct user equipment device 110 to obtain segment 2 via PN1 118 of second network 116, and upload or transmit such segment 2 to edge server 104 via first network 102. The streaming assistance application may cause user equipment devices 112 and 402 to stream or otherwise obtain segment 2, having been provided to edge server 104 by user equipment device 110 via PN1 118 of second network 116, from cache 106 of edge server 104. The streaming assistance application may cause user equipment device 112 to stream or otherwise obtain segment 3 via PN3 122 of second network 116, and may cause user equipment device 112 to upload or transmit the obtained segment 3 to edge server 104 via first network 102, for storage at cache 106. The streaming assistance application may cause user equipment devices 110 and 402 to obtain segment 3 by way of first network 102 from edge server 104, to enable such devices to generate for display segment 3. The above-described determinations, with respect to selecting which devices and networks should be used to obtain particular segments of the media asset, may be performed in the manner as described above and below, e.g., based on monitored network characteristics and any other suitable network information.

In some embodiments, the streaming assistance application may employ predictive caching techniques. For example, the streaming assistance application may cause an obtained media asset (or portions thereof) to be stored to cache 106 based at least in part on determining such media asset (or portions thereof) is being requested by and/or provided to multiple user equipment devices in physical environment 114. In some embodiments, the media asset or portions thereof may be cached upon the streaming assistance application determining that such media asset or portions thereof are likely to be requested, e.g., are popular or trending in a location corresponding to physical environment 114. In some embodiments, such determination to store the media asset or portions thereof in cache 106 may include determining the media asset or portions thereof are likely to be requested within a threshold period of time (e.g., five hours, one day or any other suitable time period). As another example, the streaming assistance application may cause an obtained media asset (or portions thereof) to be stored to cache 106 based at least in part on determining such media asset (or portions thereof) is likely to be subject to a trick-play request while being provided in physical environment 114. For example, the streaming assistance application may determine that certain types of content, such as, for example, live broadcasts of media assets, e.g., sports or news, are likely to be rewound, paused, skipped or fast-forwarded, and thus may instruct edge server 104 to cache one or more portions of such media asset. As another example, a particular portion of a media asset, e.g., a goal in a soccer game, may be determined by the streaming assistance application as likely to be re-watched by users, and thus should be cached to enable later retrieval in the event of a trick-play operation. In some embodiments, certain content may be preemptively cached by edge server 104, e.g., trending videos from any suitable source, in anticipation of multiple requests to view such content, or certain content may be cached based on having recently received multiple requests for such content. In some embodiments, content may be purged from cache 106 after a certain period of time after being stored at the cache, or after a certain period of time since a last request for such media asset or portion thereof was received, and/or any suitable caching strategy may be employed. In some embodiments, server and network assisted DASH (SAND) techniques may be employed, which may provide messaging functionalities for improving the streaming performance and caching between the DASH clients as well as bringing more intelligence to the edge caches. For example, edge server 104 can prefetch segments that are most likely to be served later to clients.

Figure 5:
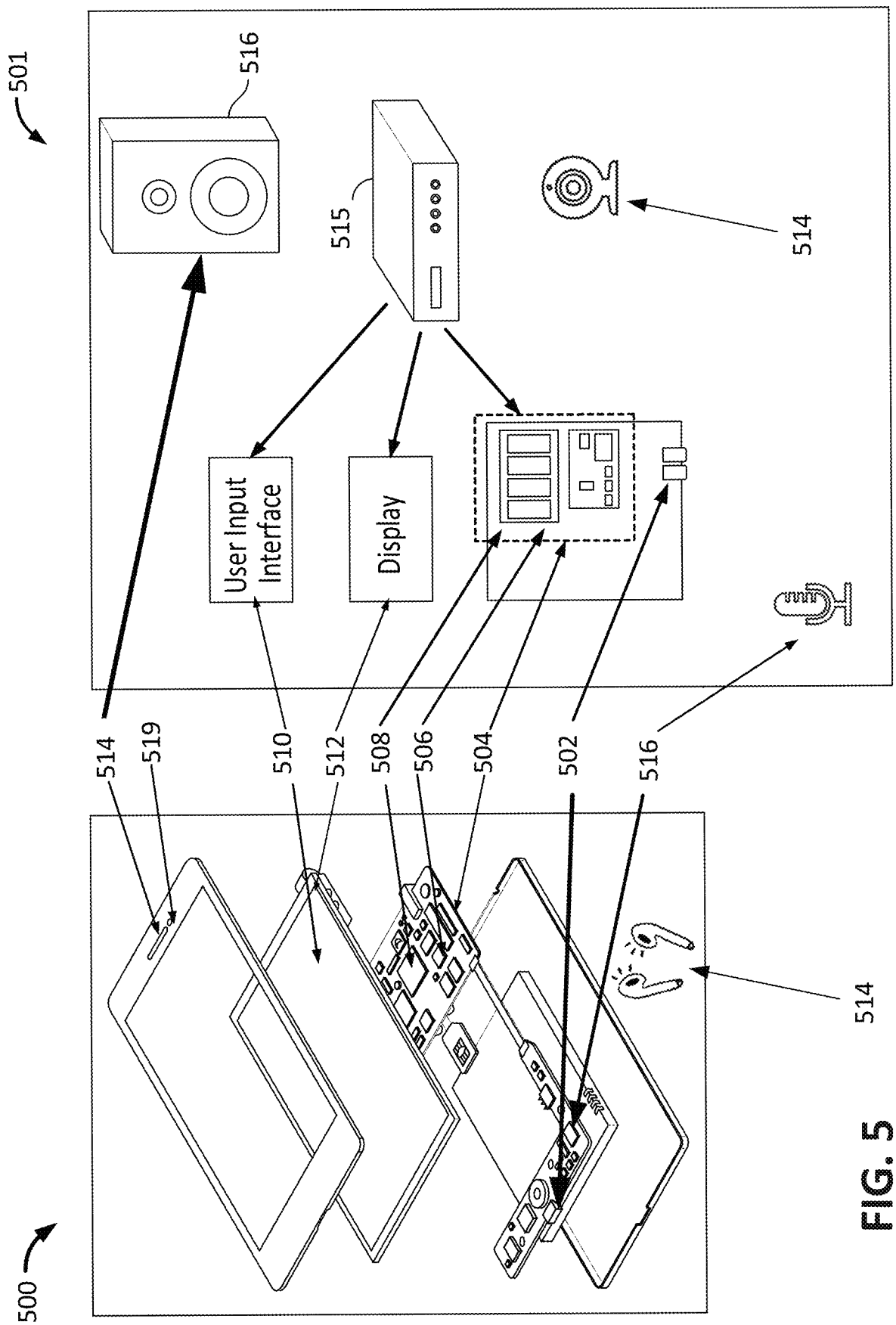
FIG. 5 shows illustrative devices, in accordance with some embodiments of this disclosure.
Figure 6:
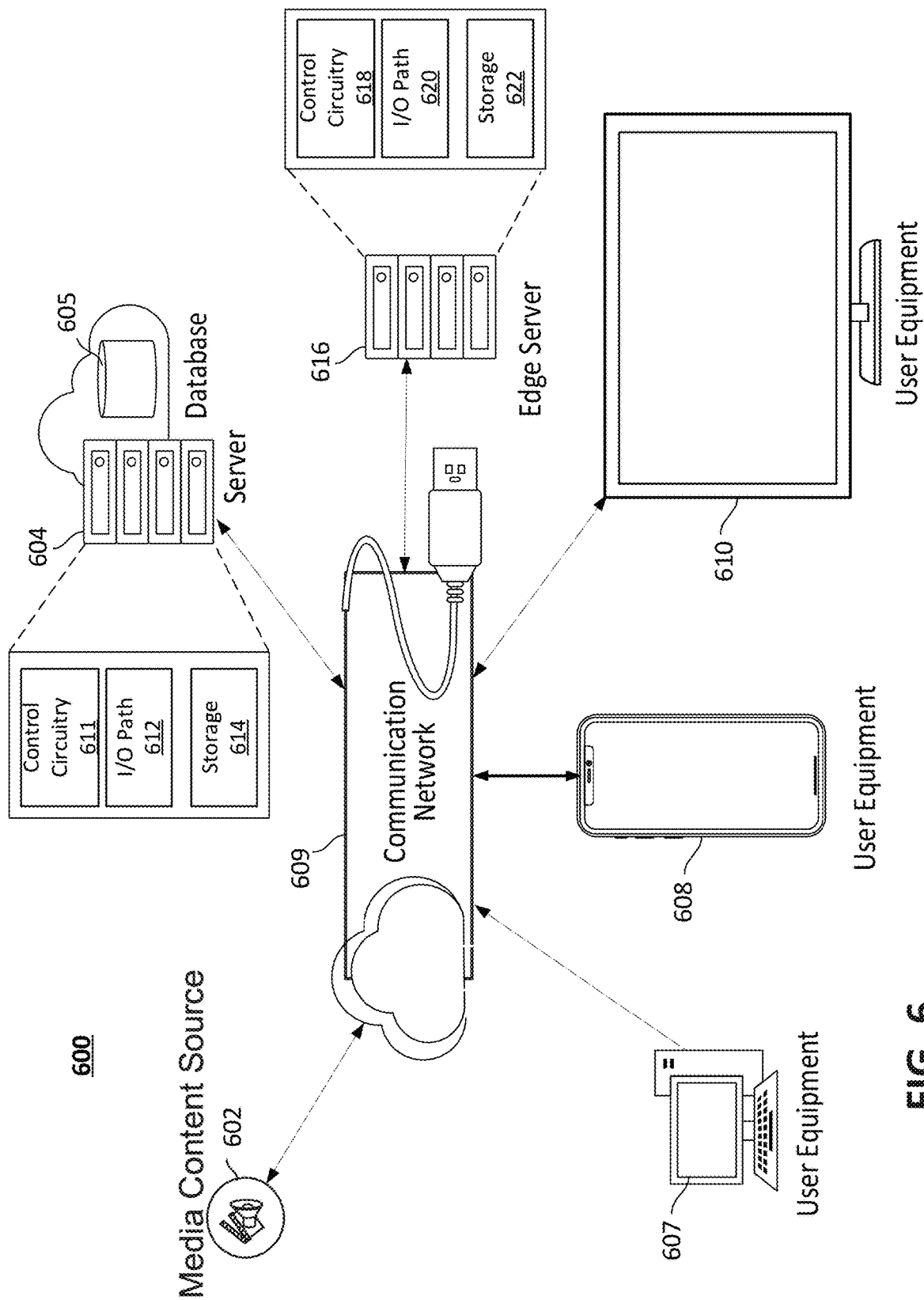
FIG. 6 shows illustrative systems, in accordance with some embodiments of this disclosure.

FIGS. 5-6 describe illustrative devices, systems, servers, and related hardware for selecting a device and/or network by which to obtain at least a portion of a media asset, in accordance with some embodiments of this disclosure. FIG. 5 shows generalized embodiments of illustrative user equipment devices 500 and 501, which may correspond to, e.g., user equipment devices 110, 112 and/or 404 of FIGS. 1, 2 and 4, and/or other suitable device. For example, user equipment device 500 may be a smartphone device, a tablet or any other suitable device capable of requesting and obtaining portions of a media asset over a network, communicating with content server 124 and edge server 104, or otherwise interfacing with the streaming assistance application described herein. In another example, user equipment device 501 may be a user television equipment system or device. User equipment device 501 may include set-top box 515. Set-top box 515 may be communicatively connected to microphone 516, audio output equipment (e.g., speaker or headphones 514), and display 512. In some embodiments, microphone 516 may receive audio corresponding to a voice of a user, e.g., a voice input or a voice command. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of devices are discussed below in connection with FIG. 6. In some embodiments, device 500 may comprise any suitable number of sensors (e.g., gyroscope or gyrometer, or accelerometer, etc.), as well as a GPS module (e.g., in communication with one or more servers and/or cell towers and/or satellites) or any other suitable localization technique, to ascertain a location of user equipment device 500. In some embodiments, user equipment device 500 comprises a rechargeable battery that is configured to provide power to the components of the device.

Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., user equipment device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the streaming assistance application stored in memory (e.g., storage 508). Specifically, control circuitry 504 may be instructed by the streaming assistance application to perform the functions discussed above and below. In some implementations, processing or actions performed by control circuitry 504 may be based on instructions received from the streaming assistance application.

In client/server-based embodiments, control circuitry 504 may include communications circuitry suitable for communicating with a server or other networks or servers. The streaming assistance application may be a stand-alone application implemented on a device or a server. The streaming assistance application may be implemented as software or a set of executable instructions. The instructions for performing any of the embodiments discussed herein of the streaming assistance application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a user equipment device 500.

In some embodiments, the streaming assistance application may be a client/server application where only the client application resides on user equipment device 500, and a server application resides on an external server (e.g., server 604 of FIG. 6 and/or media content source 602 of FIG. 6 and/or edge server 616 of FIG. 6). In some embodiments, edge server 616 may correspond to edge server 104 of FIG. 1, and content server 124 of FIG. 1 may correspond to media content source 602 and/or server 604. In some embodiments, database 605 may be a network database storing status information and network characteristic information for various networks (e.g., first network 102 and second network 116). For example, the streaming assistance application may be implemented partially as a client application on control circuitry 504 of user equipment device 500 and partially an external server (e.g., server 604 of FIG. 6 and/or media content source 602 of FIG. 6 and/or edge server 616 of FIG. 6) as a server application running on control circuitry 611. Such external server may be a part of a local area network with one or more of user equipment devices 500, 501 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 604 of FIG. 6 and/or media content source 602 of FIG. 6 and/or edge server 616 of FIG. 6), referred to as "the cloud." User equipment device 500 may be a cloud client that relies on the cloud computing capabilities from the cloud to determine whether processing should be offloaded and facilitate such offloading. When executed by control circuitry 504 or 611, the streaming assistance application may instruct control circuitry 504 or 611 circuitry to perform processing tasks for selecting a particular device and/or network to obtain a particular media asset or segment thereof. The client application may instruct control circuitry 504 to perform processing tasks for selecting a particular device and/or network to obtain a particular media asset or segment thereof.

Control circuitry 504 may include communications circuitry suitable for communicating with a server, social network service, a table or database server, or other networks or servers The instructions for carrying out the above mentioned functionality may be stored on a server (which is described in more detail in connection with FIG. 6).

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of devices, or communication of devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as streaming assistance application data described above. Nonvolatile memory may also be used (e.g., to launch a boot-up routine and other instructions). Cloud-based storage may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment device 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of user equipment device 500 and user equipment device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters, terms, phrases, alphanumeric characters, words, etc. that are received by the microphone and converted to text by control circuitry 504. In a further example, a user may voice commands that are received by a microphone and recognized by control circuitry 504. Camera 518 may be any suitable camera integrated with the equipment or externally connected and capable of capturing still and moving images.

In some embodiments, camera 518 may be a digital camera comprising a charge-coupled device (CCD) and/or a complementary metal-oxide semiconductor (CMOS) image sensor. In some embodiments, camera 518 may be an analog camera that converts to digital images via a video card.

The streaming assistance application may be implemented using any suitable architecture. For example, it may be a stand-alone application wholly-implemented on each one of device 500 and device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide the functionality of the streaming assistance application discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, participation data from a streaming assistance application and social network profile. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the streaming assistance application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user equipment device 500. This way, the processing of the instructions is performed remotely by the server while the resulting displays (e.g., that may include text, a keyboard, or other visuals) are provided locally on user equipment device 500. User equipment device 500 may receive inputs from the user via input interface 510 and transmit those inputs to the remote server for processing and generating the corresponding displays. For example, user equipment device 500 may transmit a communication to the remote server indicating that an up/down button was selected via input interface 510.

The remote server may process instructions in accordance with that input and generate a display of the application corresponding to the input (e.g., a display that moves a cursor up/down). The generated display may then be transmitted to user equipment device 500 for presentation to the user.

In some embodiments, the streaming assistance application may be downloaded and interpreted or otherwise run by an interpreter or virtual machine (run by control circuitry 504). In some embodiments, the streaming assistance application may be encoded in the ETV Binary Interchange Format (EBIF), received by control circuitry 504 as part of a suitable feed, and interpreted by a user agent running on control circuitry 504. For example, the streaming assistance application may be an EBIF application. In some embodiments, the streaming assistance application may be defined by a series of JAVA-based files that are received and run by a local virtual machine or other suitable middleware executed by control circuitry 504. In some of such embodiments (e.g., those employing MPEG-2 or other digital media encoding schemes), the streaming assistance application may be, for example, encoded and transmitted in an MPEG-2 object carousel with the MPEG audio and video packets of a program.

FIG. 6 is a diagram of an illustrative system 600, in accordance with some embodiments of this disclosure. System 600 may comprise one or more of user equipment devices 607, 608, 610 (and/or any other suitable number of user equipment devices), media content source 602, server 604, database 605, edge server 616, and/or any other suitable computing devices, or any combination thereof, which may be coupled to one or more networks, e.g., communication network 609. In some embodiments, communication network may comprise first network 102 of FIG. 1 and second network 116 of FIG. 2. At least a portion of such devices of FIG. 6 may be present in a particular environment, such as, for example, physical environment 114 of FIG. 1. In some embodiments, at least a portion of such devices may correspond to user equipment device 500 or user equipment device 501 of FIG. 5, or may include any suitable portion of the same or similar components as described in connection with FIG. 5.

Communication network 606 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The devices may also communicate with each other directly through an indirect path via communication network 606.

System 600 may comprise one or more media content sources 602 and one or more servers 604. In some embodiments, content server 124 may correspond to one or more of media content source 602 or server 604. Communications with media content source 602 and server 604 may be exchanged over one or more communications paths but are shown as a single path in FIG. 6 to avoid overcomplicating the drawing. In addition, there may be more than one of each of media content source 602 and server 604, but only one of each is shown in FIG. 6 to avoid overcomplicating the drawing. If desired, media content source 602 and server 604 may be integrated as one source device. In some embodiments, the streaming assistance application may be executed at one or more of control circuitry 611 of server 604 (and/or control circuitry of user equipment devices 607, 608, 610, or control circuitry 618 of edge server 616, or any other suitable devices, or any combination thereof). In some embodiments, any suitable data structure or any combination thereof, may be stored at database 605 maintained at or otherwise associated with server 604, and/or at storage of one or more of user equipment devices 607, 608, 610 and/or edge server 616, at least one of which may be configured to host or be in communication with database 605. User equipment device 610 may be a smart television, user equipment device 607 may be user computer equipment, and user equipment device 608 may be a wireless user communication device, each of which may be configured to include some or all of the features of the streaming assistance application described herein. In some embodiments, the streaming assistance application may be tailored to the capabilities of the particular device. In some embodiments, the streaming assistance application may facilitate the retrieval and presentation of media assets, and/or may operate in conjunction with a media application (e.g., associated with content server 124) which may present media assets to a user.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide media consumption data, social networking data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths. I/O path 612 may comprise I/O circuitry.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for a streaming assistance application stored in memory (e.g., the storage 614). Memory may be an electronic storage device provided as storage 614 that is part of control circuitry 611.

User equipment device 610 may be a smart television, user equipment device 607 may be user computer equipment, and user equipment device 608 may be a wireless user communication device, each of which may be configured to include some or all of the features of the streaming assistance application described herein. The streaming assistance application may be tailored to the capabilities of the particular device.

Edge server 616 may comprise control circuitry 618, I/O path 620 and storage 622, which may be implemented in a similar manner as control circuitry 611, I/O path 612 and storage 624, respectively of server 604. Edge server 616 may correspond to edge server 104 of FIG. 1. Edge server 616 may be configured to be in communication with one or more of user equipment devices 607, 608, 610 and server 604 and media content source 602 over communication network 609, and may be configured to perform processing tasks in connection with the streaming assistance application In some embodiments, a plurality of edge servers 616 may be strategically located at various geographic locations. In some embodiments, one or more of the edge servers may be mobile edge servers configured to provide processing support for mobile devices at various geographical regions.

Figure 7:
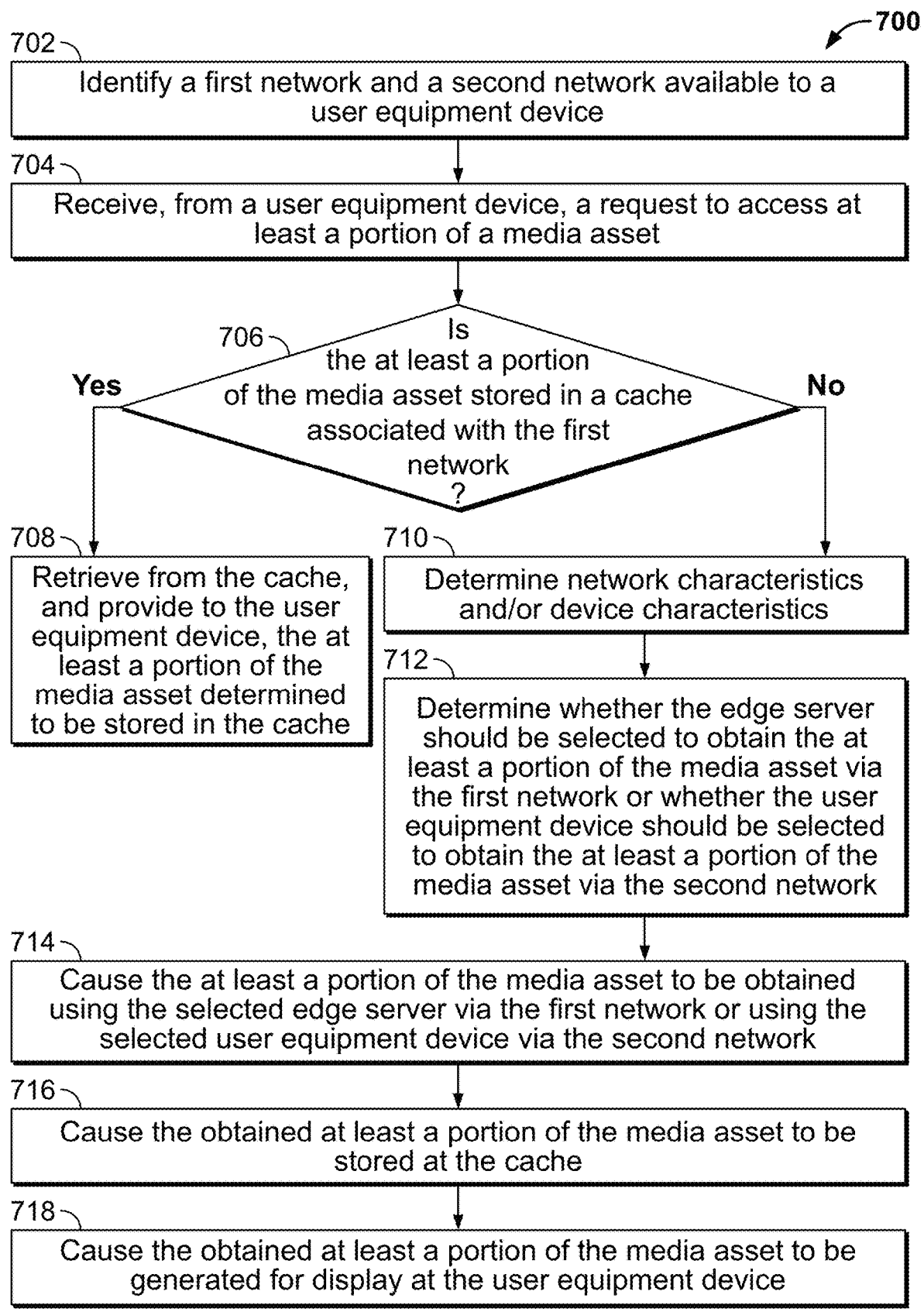
FIG. 7 is a flowchart of a detailed illustrative process for selecting a device and/or network by which to obtain at least a portion of a media asset, in accordance with some embodiments of this disclosure.

FIG. 7 is a flowchart of a detailed illustrative process for selecting a device and/or network by which to obtain at least a portion of a media asset, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At 702, control circuitry (e.g., control circuitry 618 of edge server 616 of FIG. 6) may identify a first network (e.g., first network 102 of FIG. 1) and a second network (e.g., second network 116 of FIG. 1) available to one or more user equipment devices (e.g., user equipment device 110 of FIG. 1). In some embodiments, the control circuitry may determine that such user equipment device is present within physical environment 114, which edge server 104 may also be located in, based on any suitable technique, e.g., based on determining that the user equipment device is connected to the first network, location-based techniques, and/or any other suitable technique. In some embodiments, first network 102 may be a localized network, e.g., a home network, a business network, an in-vehicle network, a network provided in public transportation or a common carrier, or any other suitable network, or any combination thereof. In some embodiments, first network 102 may be facilitated at least in part by networking equipment on the premises of physical environment 114. In some embodiments, the control circuitry may determine or receive information from, e.g., networking equipment, a remote server, and/or devices within physical environment 114, indicating a list of multiple user equipment devices connected to the first network and that support the streaming assistance application. In some embodiments, the control circuitry may determine content currently requested, or likely to be requested, by the user equipment devices included on such list of user equipment devices that are connected to the first network and that support the streaming assistance application.

In some embodiments, the first network (e.g., first network 102 of FIG. 1) may correspond to, e.g., a Wi-Fi network, and the devices of environment 114 may communicate wirelessly over a WLAN, and/or the first network 102 may correspond to a private cellular network, or any other suitable network, or any combination thereof. In some embodiments, a second network (e.g., second network 116 of FIG. 1) may correspond to a cellular network, a satellite network or any other suitable network or any combination thereof, and may include a network (e.g., provided by an MNO) usable by a user equipment device to connect to content server 124. In some embodiments, certain portions of the second network may function as a backhaul connection to content server 124 for edge server 104 within the first network.

At 704, control circuitry (e.g., control circuitry 618 of edge server 616 of FIG. 6) may receive, from a user equipment device or devices (e.g., user equipment device 110 of FIG. 1), a request to access at least a portion of a media asset. The media asset may be, for example, a live broadcast, VOD content or any other suitable content or any combination thereof. In some embodiments, the request may be received by the control circuitry in response to providing a manifest file, usable to play the media asset, to the user equipment device. In some embodiments, 704 may include determining that user equipment devices within the same particular physical environment may be requesting the same media asset and/or the same portions thereof.

At 706, control circuitry may determine whether the cache (e.g., cache 106 of FIG. 1) currently stores a media asset, or portion thereof, that matches the at least a portion of a media asset requested at 704. For example, the control circuitry may compare titles and/or metadata of the media asset associated with the received request and/or timestamps of the media asset associated with the received request to data stored in the cache. If the control circuitry determines that the cache stores such content, processing may proceed to 708; otherwise processing may proceed to 710.

At 708, the control circuitry (e.g., control circuitry 618 of edge server 616 of FIG. 6) may retrieve from the cache (e.g., cache 106 of edge server 104 of FIG. 1), and provide to the user equipment device (e.g., user equipment device 110), the at least a portion of the media asset determined to be stored in the cache. For example, the control circuitry may transmit the portion of the media asset retrieved from the cache to user equipment device 110 (e.g., by way of the first network), to cause and enable user equipment device 110 to generate for display the at least a portion of the media asset.

At 710, the control circuitry (e.g., control circuitry 618 of edge server 616 of FIG. 6) may determine network and/or device characteristics associated with devices included in the particular physical environment (e.g., environment 114 of FIG. 1). For example, the control circuitry may monitor network characteristics of first network 102 and/or second network 116 (which may include monitoring network characteristics of networks 118, 120 and/or 122 and/or any other suitable networks). In some embodiments, the control circuitry may monitor one or more quality-of-service characteristics (e.g., available bandwidth, error rate, bit rate, throughput lag, transmission delay, availability, or jitter, or any other suitable network characteristic, or any combination thereof) experienced by user equipment devices 110 and/or 112, and/or any other suitable parameters. In some embodiments, the control circuitry may monitor network availability, perform bandwidth estimate techniques, and/or any other suitable network characteristic or network status information or other tools may be employed, or any combination thereof.

As another example, the control circuitry may monitor the quality of the available public or private networks and/or Wi-Fi uplink and downlink capacity using passive and/or active network estimation techniques, e.g., to function similarly as an RNIS or utilize such a service from another network node. In some embodiments, signal quality indicators (e.g., RSSI) and packet information (e.g., response times) can be monitored and used as part of the selection process with respect to selecting the device and/or network that is to obtain a particular segment of a media asset. Additionally or alternatively, wireless signal characteristics, such as, for example, CSI and/or RCPI of devices and/or networking equipment may be monitored. In some embodiments, the streaming assistance application may use information of available mobile network operator's networks, information of the connected users, and share the network usage by number of users in each MNO's network.

At 712, the control circuitry (e.g., control circuitry 618 of edge server 616 of FIG. 6) may determine whether the edge server (e.g., edge server 104 of FIG. 1, which may correspond to edge server 616 of FIG. 6) should be selected to obtain the at least a portion of the media asset (having been requested at 704) via the first network. The control circuitry may also determine whether the user equipment device (e.g., user equipment device 110 of FIG. 1) should instead be selected to obtain the at least a portion of the media asset via the second network. In some embodiments, the control circuitry may additionally or alternatively determine whether other devices (e.g., user equipment device 112 of FIG. 1, user equipment device 402 of FIG. 4, or any other suitable device, or any combination thereof) should instead obtain the requested at least a portion of the media asset. In some embodiments, the control circuitry may only consider as candidate devices to obtain the portion of the media asset those devices having support for the streaming assistance application, and/or those devices currently requesting the same segment requested at 704 or other segments of the same media asset associated with the request of 704.

The determination at 712 may be based at least in part on the network characteristics and/or device characteristics determined at 710. For example, if a certain network is unavailable, the control circuitry may determine that such network should not be utilized. As another example, any of the network or device characteristics determined at 710 may be compared to a threshold value, to determine the suitability of the network, and/or network or device characteristics determined at 710 may be compared to each other to identify an optimal device and network combination.

At 714, based on the optimal device and network combination determined at 712, the control circuitry may cause the at least a portion of the media asset to be obtained. For example, such portion of the media asset may be obtained using edge server 104 by way of first network 102 (and via a backhaul communications network to content server 124, where such backhaul communications network may include at least a portion of second network 116). Alternatively, such portion of the media asset may be obtained using user equipment device 110 by way of second network 116 (e.g., a cellular network). In some embodiments, a different user equipment device, e.g., user equipment device 112 of FIG. 1, may be used to obtain the portion of the media asset, such as by way of the second network, such as if that device and network pair is determined to be optimal as compared to other candidate device and network pairs. In some embodiments, a heuristic-based approach, and/or machine learning techniques, may be used to identify the optimal device and network pairs from among the candidate device and network pairs. In some embodiments, retrieval of a particular segment of a media asset may be divided as between user equipment devices and/or as between user equipment devices and edge server(s).

At 716, the control circuitry (e.g., control circuitry 618 of edge server 616 of FIG. 6) may cause the obtained at least a portion of the media asset to be stored at the cache. For example, if the control circuitry of the edge server was selected at 714 to retrieve the portion or segment of the media asset, then such control circuitry may cause the obtained portion of the media asset to be stored at a cache (e.g., cache 106 of edge server 104 of FIG. 1). On the other hand, if a particular user equipment device was used to obtain the particular segment, the control circuitry may cause to be received, or may otherwise receive, such obtained segment from the particular user equipment device, and may cause such segment to be stored at the cache.

In some embodiments, predictive caching techniques may be used to determine whether to store an obtained media asset or portion(s) thereof, and/or how long such media asset or portion(s) thereof should be stored. For example, the control circuitry may determine that certain types of content, such as, for example, live broadcasts of media assets, e.g., sports or news, are likely to be rewound, paused, skipped or fast-forwarded, and thus may instruct the edge server to cache one or more portions of such media asset. As another example, a particular portion of a media asset, e.g., a goal in a soccer game, may be determined by the streaming assistance application as likely to be re-watched by users, and thus should be cached to enable later retrieval in the event of a trick-play operation. In some embodiments, certain content may be preemptively cached by the edge server, e.g., trending YouTube videos, in anticipation of multiple requests to view such content, or certain content may be cached based on having recently received multiple requests for such content. In some embodiments, content may be purged from cache 106 after a certain period of time after being stored at the cache, or after a certain period of time since a last request for such media asset or portion thereof was received, and/or any suitable caching strategy may be employed. In some embodiments, server and network-assisted DASH (SAND) techniques may be employed, which may provide messaging functionalities for improving the streaming performance and caching between the DASH clients as well as bringing more intelligence to the edge caches. For example, the edge server can prefetch segments that are most likely to be served later to clients.

At 718, the control circuitry may cause the obtained at least a portion of the media asset to be generated for display at the user equipment device (e.g., user equipment device 110 having requested access to the portion of the media asset). In some embodiments, the control circuitry may receive various operations, e.g., trick-play commands, recording commands, or any other suitable operation, or any combination thereof, in connection with the playing of the media asset. The process of FIG. 7 may be repeated for each subsequent portion of the media asset. For example, the control circuitry, upon determining that subsequent portions of the media asset are being requested or are likely to be requested by the client user equipment device, may perform the process of FIG. 7 for such subsequent portions of the media asset. For example, the control circuitry may, from segment to segment, cause different portions of the media asset to be obtained from different device and network combinations, to optimize the delivery of quality media assets to the client device in an efficient manner.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   identifying a first network and a second network available to a user equipment device, wherein the user equipment device is configured to communicate with a content server via at least one of the first network or via the second network, and wherein the first network is associated with an edge server comprising a cache;
   receiving, from the user equipment device, a request to access at least a portion of a media asset;
   determining whether the at least a portion of the media asset is stored in the cache;
   in response to determining that the at least a portion of the media asset is not stored in the cache:
      determining whether the edge server should be selected to obtain the at least a portion of the media asset via the first network from the content server or the user equipment device should be selected to obtain the at least a portion of the media asset via the second network from the content server;
   in response to determining that the user equipment device should be selected to obtain the at least a portion of the media asset via the second network from the content server, causing the at least a portion of the media asset to be obtained using the selected user equipment device via the second network;
   causing the at least a portion of the media asset obtained using the selected user equipment device via the second network to be stored at the cache; and
   causing the at least a portion of the media asset obtained using the selected user equipment device via the second network to be generated for display at the user equipment device.

2. The method of claim 1, wherein the user equipment device is a first user equipment device, the method further comprising:
   receiving, from a second user equipment device, a request to access the at least a portion of the media asset;
   wherein determining whether the edge server should be selected to obtain the at least a portion of the media asset via the first network or the first user equipment device should be selected to obtain the at least a portion of the media asset via the second network further comprises determining whether the edge server should be selected to obtain the at least a portion of the media asset via the first network or the first user equipment device should be selected to obtain the at least a portion of the media asset via the second network or the second user equipment device should be selected to obtain the at least a portion of the media asset via the second network.

3. The method of claim 2, wherein:
   the first network is a localized private network,
   the second network is a cellular network;
   each of the first user equipment device and the second user equipment device is located in a physical environment associated with the localized private network; and
   the at least a portion of the media asset obtained using the selected user equipment device via the second network is provided to the edge server by the selected first user equipment device via the localized private network.

4. The method of claim 3, wherein:
   causing the at least a portion of the media asset obtained using the selected user equipment device via the second network to be stored to the cache is performed based at least in part on determining that the at least a portion of the media asset is likely to be requested by another user equipment device in the physical environment associated with the localized private network.

5. The method of claim 3, wherein:
   causing the at least a portion of the media asset obtained using the selected user equipment device via the second network to be stored to the cache is performed based at least in part on determining that one or more portions of the media asset are being provided to a plurality of user equipment devices in the physical environment associated with the localized private network.

6. The method of claim 1, wherein:
   the media asset is a live broadcast; and
   causing the at least a portion of the media asset obtained using the selected user equipment device via the second network to be stored to the cache is performed based at least in part on determining that the user equipment device is likely to request that a trick-play operation be performed on the at least a portion of the media asset.

7. The method of claim 1, wherein the at least a portion of a media asset is a first portion of the media asset, the method further comprising:
   receiving, from the user equipment device, a request to access a second portion of a media asset;
   in response to determining that the second portion of the media asset is not stored in the cache:
      determining whether the edge server should be selected to obtain the second portion of the media asset via the first network or the user equipment device should be selected to obtain the second portion of the media asset via the second network; and
   in response to determining that the edge server should be selected to obtain the second portion of the media asset via the first network from a content server, causing the second portion of the media asset to be obtained using the selected edge server via the first network.

8. The method of claim 1, further comprising:
   causing the user equipment device to provide the at least a portion of the media asset to the edge server via the first network.

9. The method of claim 1, wherein:
   determining whether the edge server should be selected to obtain the at least a portion of the media asset via the first network or whether the user equipment device should be selected to obtain the at least a portion of the media asset via the second network comprises:

determining network characteristics associated with the first network;
determining network characteristics associated with the second network; and
selecting the user equipment device to obtain the at least a portion of the media asset via the second network based at least in part on the determined network characteristics associated with the first network and the determined network characteristics associated with the second network.

10. The method of claim 1, wherein:
identifying the second network available to the user equipment device comprises receiving, at the edge server, an indication from the user equipment device specifying the second network and indicating a portion of the second network allocated for use in association with the edge server.

11. A computer-implemented system comprising:
an edge server comprising a cache; and
control circuitry configured to:
   identify a first network and a second network available to a user equipment device, wherein the user equipment device is configured to communicate with a content server via at least one of the first network or via the second network, and wherein the first network is associated with the edge server comprising the cache;
   receive, from the user equipment device, a request to access at least a portion of a media asset;
   determine whether the at least a portion of the media asset is stored in the cache;
   in response to determining that the at least a portion of the media asset is not stored in the cache:
      determine whether the edge server should be selected to obtain the at least a portion of the media asset via the first network from the content server or the user equipment device should be selected to obtain the at least a portion of the media asset via the second network from the content server;
      in response to determining that the user equipment device should be selected to obtain the at least a portion of the media asset via the second network from the content server, cause the at least a portion of the media asset to be obtained using the selected user equipment device via the second network;
   cause the at least a portion of the media asset obtained using the selected user equipment device via the second network to be stored at the cache; and
   cause the obtained at least a portion of the media asset to be generated for display at the user equipment device.

12. The system of claim 11, wherein the user equipment device is a first user equipment device, and the control circuitry is further configured to:
receive, from a second user equipment device, a request to access the at least a portion of the media asset;
determine whether the edge server should be selected to obtain the at least a portion of the media asset via the first network or the first user equipment device should be selected to obtain the at least a portion of the media asset via the second network by further determining whether the edge server should be selected to obtain the at least a portion of the media asset via the first network or the first user equipment device should be selected to obtain the at least a portion of the media asset via the second network or the second user equipment device should be selected to obtain the at least a portion of the media asset via the second network.

13. The system of claim 12, wherein:
the first network is a localized private network,
the second network is a cellular network;
each of the first user equipment device and the second user equipment device is located in a physical environment associated with the localized private network; and
the control circuitry is further configured to:
   cause the at least a portion of the media asset obtained using the selected user equipment device via the second network to be provided to the edge server by the selected first user equipment device or by the selected second user equipment device via the localized private network.

14. The system of claim 13, wherein:
the control circuitry is configured to cause the at least a portion of the media asset obtained using the selected user equipment device via the second network to be stored at the cache by determining that the at least a portion of the media asset is likely to be requested by another user equipment device in the physical environment associated with the localized private network.

15. The system of claim 13, wherein:
the control circuitry is configured to cause the at least a portion of the media asset obtained using the selected user equipment device via the second network to be stored at the cache by determining that one or more portions of the media asset are being provided to a plurality of user equipment devices in the physical environment associated with the localized private network.

16. The system of claim 11, wherein:
the media asset is a live broadcast; and
the control circuitry is configured to cause the at least a portion of the media asset obtained using the selected user equipment device via the second network to be stored at the cache by determining that the user equipment device is likely to request that a trick-play operation be performed on the at least a portion of the media asset.

17. The system of claim 11, wherein the at least a portion of a media asset is a first portion of the media asset, and the control circuitry is further configured to:
receive, from the user equipment device, a request to access a second portion of a media asset;
in response to determining that the second portion of the media asset is not stored in the cache:
   determine whether the edge server should be selected to obtain the second portion of the media asset via the first network or the user equipment device should be selected to obtain the second portion of the media asset via the second network; and
in response to determining that the edge server should be selected to obtain the second portion of the media asset via the first network from a content server, cause the second portion of the media asset to be obtained using the selected edge server via the first network.

18. The system of claim 11, wherein the control circuitry is further configured to:
cause the user equipment device to provide the obtained at least a portion of the media asset to the edge server via the first network.

19. The system of claim 11, wherein the control circuitry is further configured to:

determine whether the edge server should be selected to obtain the at least a portion of the media asset via the first network or whether the user equipment device should be selected to obtain the at least a portion of the media asset via the second network by:

determining network characteristics associated with the first network;

determining network characteristics associated with the second network; and selecting user equipment device to obtain the at least a portion of the media asset via the second network, based at least in part on the determined network characteristics associated with the first network and the determined network characteristics associated with the second network.

20. The system of claim 11, wherein the control circuitry is further configured to:

identify the second network available to the user equipment device by receiving, at the edge server, an indication from the user equipment device specifying the second network and indicating a portion of the second network allocated for use in association with the edge server.

\* \* \* \* \*